(12) United States Patent
McFarland

(10) Patent No.: US 7,378,980 B2
(45) Date of Patent: *May 27, 2008

(54) TRIANGULATION OF POSITION FOR AUTOMATED BUILDING CONTROL COMPONENTS

(75) Inventor: Norman R. McFarland, Palatine, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 221 days.

This patent is subject to a terminal disclaimer.

(21) Appl. No.: 10/953,031

(22) Filed: Sep. 29, 2004

(65) Prior Publication Data

US 2006/0071780 A1 Apr. 6, 2006

(51) Int. Cl.
*G08B 21/00* (2006.01)

(52) U.S. Cl. .............................. 340/686.6; 340/825.49; 340/539.2

(58) Field of Classification Search ............. 340/686.6, 340/825.36, 825.49, 540, 541, 539.13, 539.14, 340/539.1, 539.2, 525, 3.1, 3.5
See application file for complete search history.

(56) References Cited

U.S. PATENT DOCUMENTS

| | | | |
|---|---|---|---|
| 4,751,689 A | 6/1988 | Kobayashi | |
| 4,894,810 A | 1/1990 | Jukkala | |
| 5,266,944 A * | 11/1993 | Carroll et al. | 340/825.36 |
| 5,300,875 A | 4/1994 | Tuttle | |
| 5,491,670 A | 2/1996 | Weber | |
| 5,638,046 A | 6/1997 | Malinowski | |
| 5,953,368 A | 9/1999 | Sanderford et al. | |
| 5,987,058 A | 11/1999 | Sanderford et al. | |
| 6,078,269 A | 6/2000 | Markwell et al. | |
| 6,369,710 B1 * | 4/2002 | Poticny et al. | 340/572.1 |
| 6,560,462 B1 | 5/2003 | Ravi et al. | |
| 6,700,533 B1 | 3/2004 | Werb et al. | |
| 6,735,630 B1 | 5/2004 | Gelvin et al. | |
| 6,745,038 B2 * | 6/2004 | Callaway et al. | 455/456.1 |
| 6,774,797 B2 * | 8/2004 | Freathy et al. | 340/573.1 |
| 6,856,236 B2 * | 2/2005 | Christensen et al. | 340/3.5 |
| 6,990,335 B1 | 1/2006 | Shamoon et al. | |
| 7,002,470 B1 | 2/2006 | Miao | |
| 7,035,650 B1 | 4/2006 | Moskowitz et al. | |
| 7,064,660 B2 * | 6/2006 | Perkins et al. | 340/539.13 |
| 7,076,211 B2 | 7/2006 | Donner et al. | |
| 7,081,693 B2 | 7/2006 | Hamel et al. | |
| 7,142,107 B2 | 11/2006 | Kates | |
| 7,148,803 B2 | 12/2006 | Bandy et al. | |
| 2002/0006788 A1 | 1/2002 | Knutsson et al. | |
| 2002/0042274 A1 | 4/2002 | Ades | |
| 2002/0143935 A1 | 10/2002 | Schenkel et al. | |
| 2003/0007473 A1 | 1/2003 | Strong et al. | |
| 2003/0012168 A1 | 1/2003 | Elson et al. | |
| 2003/0020595 A1 | 1/2003 | Wacyk | |
| 2003/0035342 A1 | 2/2003 | Harrington et al. | |
| 2003/0051032 A1 | 3/2003 | Schenkel et al. | |
| 2003/0122577 A1 | 7/2003 | Kail, IV | |
| 2003/0137968 A1 | 7/2003 | Lareau et al. | |
| 2003/0142587 A1 | 7/2003 | Zeitzew | |
| 2003/0206115 A1 | 11/2003 | Krumm et al. | |
| 2004/0100394 A1 | 5/2004 | Hitt | |

(Continued)

*Primary Examiner*—George A Bugg
*Assistant Examiner*—Travis R Hunnings

(57) ABSTRACT

In a building environment, coordinate locations for building automation devices is determined. The location may be based on triangulation methods for determining coordinate locations from wireless distance information for the building automation devices. Erroneous determinations for coordinate location are identified and a corrected coordinate location determined according to distance determinations.

16 Claims, 7 Drawing Sheets

U.S. PATENT DOCUMENTS

| | | |
|---|---|---|
| 2004/0104841 A1 | 6/2004 | Syrjarinne |
| 2004/0144849 A1 | 7/2004 | Ahmed |
| 2004/0212500 A1 | 10/2004 | Stilp |
| 2005/0040943 A1 | 2/2005 | Winick |
| 2005/0135292 A1 | 6/2005 | Graumann |
| 2006/0044152 A1 | 3/2006 | Wang |
| 2006/0046664 A1 | 3/2006 | Paradiso et al. |
| 2006/0071782 A1* | 4/2006 | Ahmed et al. ......... 340/539.13 |
| 2006/0074494 A1* | 4/2006 | McFarland ..................... 700/1 |

* cited by examiner

TRIANGULATION OF POSITION FOR AUTOMATED BUILDING CONTROL COMPONENTS

BACKGROUND

The present invention relates to wireless building automation. In particular, coordinate position of wireless building automation devices may be determined.

Building control devices are positioned throughout a building. Security, fire, heating, ventilation, air conditioning (HVAC) or other networks of devices automate building control. For example, a temperature sensor or thermostat is mounted to a wall in a room to provide for control to a corresponding actuator located above a ceiling in the room for controlling airflow, heating or cooling in the room. As another example, a motion sensor is positioned on a ceiling for actuating a light controlled by a ballast above the ceiling.

The relative position of devices with respect to each other and with respect to building structure are used for building automation. The desired locations for devices are plotted on a chart, blueprint or drawing for the building structure. From the chart, the devices are located manually within the building structure at or near corresponding structures. The location of the final installation of a device may deviate from a chart or blueprint due to dynamics in the installation process. The chart or blueprint, therefore, may not accurately or precisely reflect the device locations.

Manually locating devices may be time consuming and costly. Locating a faulty or malfunctioning device is difficult due to inaccuracies in the chart or blueprint, particularly where the device is located out of site above a ceiling or in a wall. Adding visual indications identifying a location of an otherwise out of site device is unaesthetic.

BRIEF SUMMARY

By way of introduction, the embodiments described below include methods, processes, apparatuses, and systems for applying building automation to wireless building automation devices based on determining locations of the devices.

In a building automation, various features alone or in combination assist in determining distances. A position for a building automation device may be determined based on distance information, including distances between devices, and between devices and one or more reference sources, points, or positions. The distance information may be determined using wireless communications, acoustic signals or radio frequency information. The wireless communication may be directional or omni-directional. A coordinate location of a device may be determined for the device. The determination of coordinate locations of other devices may be propagated based on determined locations for building automation devices. An erroneous location determination may be identified and corrected according to distance information for building automation devices located proximate to the erroneous reported or determined location.

In a first aspect, a method is provided for locating building automation devices. A distance to a reference source for building automation devices is determined using wireless communication of distance information. Distances between the devices are also determined using wireless communication of distance information between building automation devices The locations of the building automations devices are determined according to the distance determinations to the reference source and the distance determinations between the devices.

In a second aspect, a method for controlling building automation is provided. A coordinate location for a building automation device is determined with respect to a reference point. The coordinate location is determined using wireless communication. A coordinate location for other building automation devices is determined according to the coordinate location for the first building automation device.

In a third aspect, a building automation system is provided. The system includes a reference source from which distance information may be determined. A building automation device is in communication with the reference source. A processor is configured to determine a coordinate location for the building automation device according to wireless communication between the reference source and the at least one building automation device.

The present invention is defined by the following claims. Nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In a wireless building architecture system, the coordinate location or local position of various automation devices is determined using a distance measurement. By providing a distance measurements from at least one predetermined or known reference point, the coordinate location or local position may be identified through triangulation or other techniques for determining coordinate locations. The known reference point may be a building automation device. The coordinate locations of devices within a network are determined according to distance information for the devices to known coordinate locations. The coordinate location may be relative to a two- or three-dimensional space.

Distance information may be determined using wireless communication techniques for determining distances. For example, time-of-flight information of a wireless signal may be used to identify a distance. Radio frequency, acoustic, combinations thereof or other types of signals may be used.

Figure 1:
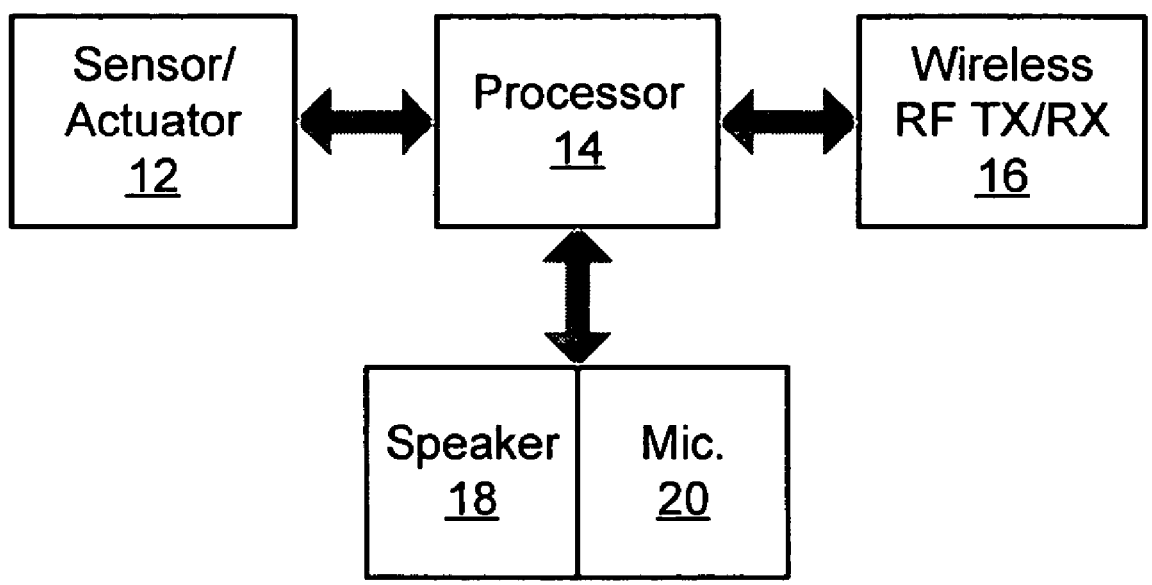
FIG. 1 is a block diagram of one embodiment of a building automation device.
Figure 2:
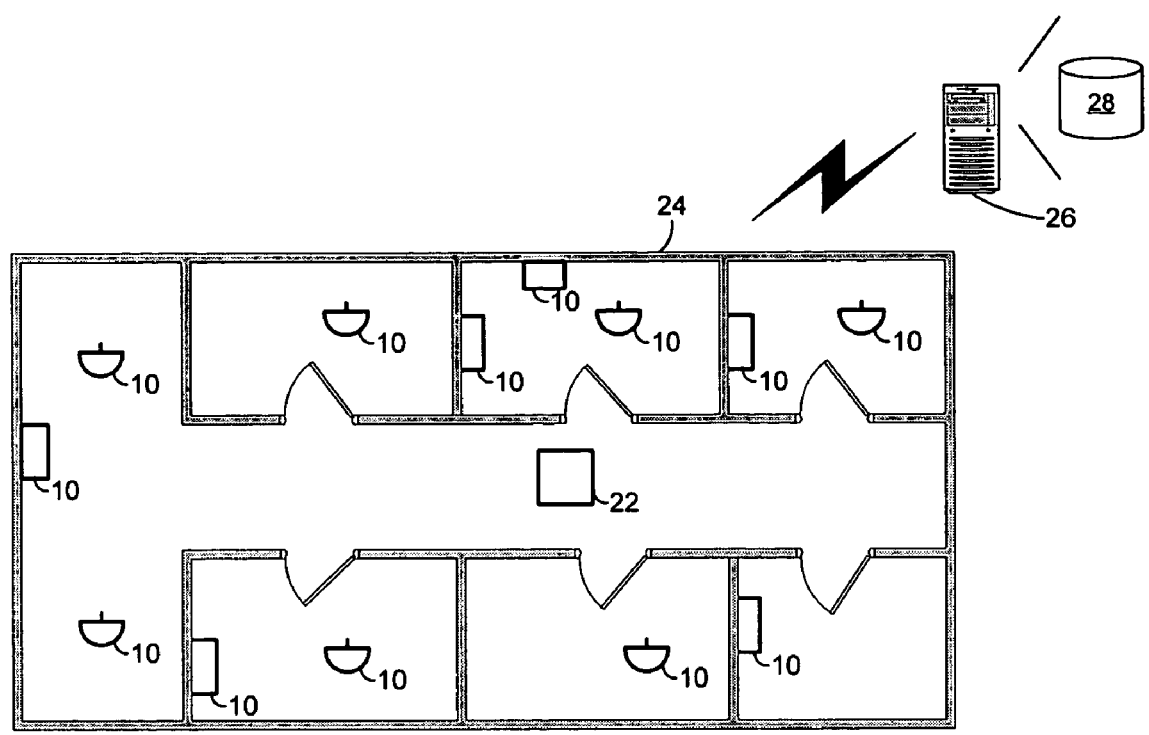
FIG. 2 is a top plan view of one embodiment of a network of building automation devices.

FIGS. 1 and 2 show a system for determining a distance for building automation components. FIG. 1 shows an exemplary building automation device 10 used within the system. The building automation device 10 includes a sensor or actuator 12, a processor 14, a wireless radio frequency transmitter or receiver 16, a speaker 18 and a microphone 20. Additional, different or fewer components may be provided. For example, the building automation device 10 is free of the speaker 18, the microphone 20, the speaker 18 and the microphone 20, the wireless transmitter or receiver 16, and/or the sensor or actuator 12.

The building automation device 10 is a controller, actuator, sensor or other device in a security, fire, environment control, HVAC, lighting, or other building automation system. The building automation device 10 may sense conditions within a building, report conditions within a building, and/or generate a signal representative of a building condition. The building automation device 10 also or alternatively may actuate building control components. As a controller, the building automation device 10 may be free of the sensor or actuator 12. In one embodiment, the building automation device 10 includes a wired connection to one or other devices 10 within the network and is either free of or also includes the wireless radio frequency transmitter or receiver 16. In yet another embodiment, the building automation device 10 is a wireless device free of communications or connections over wires to other remote devices. For example, the building automation device 10 is any one of the building control system devices, processors or controllers disclosed in U.S. patent application Ser. No. 10/915,034, the disclosure of which is incorporated herein by reference.

The sensor or actuator 12 is a single sensor, multiple sensors, single actuator, multiple actuators or combinations thereof. As a sensor, the sensor 12 is a temperature, pressure, humidity, fire, smoke, occupancy, air quality, flow, velocity, vibration, rotation, enthalpy, power, voltage, current, light, gas, $CO_2$, CO, combinations thereof or other now known or later developed sensor. The sensor also may be a limit or proximity switch. Micro-electromechanical or larger sensors may be provided for sensing any of various environmental or building conditions.

As an actuator, the actuator 12 is a valve, relay, solenoid, speaker, bell, switch, motor, motor starter, damper, pump, pneumatic device, combinations thereof or other now known or later developed actuating devices for building automation. For example, the actuator 12 is a valve for controlling flow of fluid or gas in a pipe. As another example, the actuator 12 is a relay or other electrical control for opening and closing doors, releasing locks, actuating lights, or starting and stopping motors. As yet another example, the actuator 12 is a solenoid to open or close a damper, such as for altering airflow.

The device 10 may be a controller. The controller is positioned at a known or unknown location. As a controller, the building automation device 10 interacts with other building automation devices 10 for configuring, coordinating, influencing, controlling, or performing other control or reporting functions.

The processor 14 is a general processor, digital signal processor, application-specific integrated circuit (ASIC), fuel programmable gate array, analog circuit, digital circuit, network of processors, programmable logic controller, combinations thereof or other now known or later developed device for processing data and/or controlling operation of the building automation device 10. The processor 14 has a processing power or capability and associated memory corresponding to the desired operation of the device 10 or a class of devices, such as an eight, sixteen, thirty-two, or sixty-four bit processor. By minimizing processor requirements and associated memory, the cost and power consumption of the device 10 may be reduced. Larger or smaller processors and associated memories may be used, such as a larger processor where the device 10 is operating as a controller.

The processor 14 is operable to cause transmission or reception actions by the wireless radio frequency transmitter or receiver 16, the speaker 18 or the microphone 20. For example, the processor 14 is operable to cause the acoustic speaker 18 to transmit an ultrasound signal. The processor 14 is also operable to cause the microphone 20 to receive an ultrasound signal and determine a distance from another device as a function of the received signal. Alternatively or additionally, the processor 14 is operable to cause the wireless radio frequency transmitter or receiver 16 to transmit data for determining the distance. Additionally or alternatively, the wireless radio frequency transmitter 16 transmits a determined distance or distances as well as data regarding the processes and operation of the sensor or actuator 12.

The wireless radio frequency transmitter and receiver 16 or the speaker 18 are alternate wireless transmitters operable to transmit a signal for distance determination. Similarly, the wireless radio frequency receiver 16 and microphone 20 are alternative wireless receivers operable to receive signals for distance determination.

The wireless radio frequency transmitter or receiver 16 is a transmitter, a receiver or a transceiver. The wireless radio frequency transceiver 16 operates pursuant to any of various now known or later developed communications protocols, such as IEEE 802 wireless communications protocols. The wireless radio frequency transceiver 16 is operable to transmit digital or analog information, such as a carrier wave modulated by digital signals. The wireless transceiver 16 transmits timing or other distance related information, such as a sinusoidal pulse. The wireless transceiver 16 is operable to receive timing or distance information, such as a transmitted pulse subjected to attenuation or other environmental alteration. Filters or other processes may be used to remove noise or other undesired information.

In an alternative or additional embodiment, the speaker 18 and microphone 20 are used for wirelessly transmitting and receiving information for determining a distance. The speaker 18 and microphone 20 are an acoustic transducer or transceiver. A piezoelectric ceramic or composite piezoelectric, a micro-electromechanical device, such as a flexible membrane or membranes, waveguide, or other now known or later developed speakers and microphones as separate devices or transceivers may be used. An array of acoustic transceivers is provided for directional processing, such as determining an angle for transmissions or receptions. An array may alternatively or additionally be used for generating a desired radiation pattern. Alternatively, a single acoustic transceiver is positioned on an outside of the device 10 to maximize the radiation pattern. The speaker 18 and microphone 20 are sized and shaped for operation at ultrasound frequencies, such as 20 kHz or higher. Frequencies in the megahertz range, such as 1 to 20 MHz, lower frequencies, or audible frequencies may be used.

The processor 14 is operable to control the acoustic transceiver 18, 20 for distance determination operation. For example, the processor 14 causes the acoustic transceiver 18, 20 to transmit an acoustic pulse, such as a sinusoidal, bipolar or unipolar pulse. Any of various pulse lengths may be used, such as single cycle or multiple cycle pulses. A desired transmit amplitude is provided, such as associated with transmitting the acoustic energy over a distance of 10-20 meters. The transmit amplitude may be adjustable. Depending on the building environment, such as an enclosed office building, the transmit amplitude may be set for reception by a likely plurality of other devices within a restricted space. The processor 14 is also operable to process received information, such as identifying a zero crossing, amplitude or other characteristic of received acoustic energy.

Where a wireless radio frequency transceiver 16 is provided with the speaker 18 and microphone 20, the wireless radio frequency transceiver 16 is used to control operation of the processor 14 and distance measurements using the acoustic transceiver 18, 20. Control signals are received wirelessly using the wireless radio frequency transceiver 16. The control signals coordinate distance determination among various devices or for a specific device. The control signals may indicate when and what type of a test signal or actual measurement signal is transmitted for distance determination. The control signals from the wireless transceiver 16 may also or alternatively instruct the processor 18 to act to receive or not act to receive acoustic transmission from one or other different devices. Control signals may be used to alter an insert time delay, set signal strength, select signal processing, establish communications protocol, provide the delay information, provide time-of-flight information or control another process.

The processor 14 also may be operable to perform distance determination functions. In an embodiment, the processor 14 determines a distance between building automation devices 10, the building automation device 10 and another device, or the building automation device 10 and a reference source. The reference source may be an origin of a coordinate system, a building reference, or building automation device 10 having a known coordinate location. The distance is determined by the same processor used for initiating the transmission of a signal, the processor that receives a first transmitted signal, or a processor remote from either of the devices that transmitted the distance signal or received the distance signal for determining time-of-flight.

Distance determinations may be provided using time-of-flight information associated with transmitting from one component and reception at another component may be used. Alternatively or additionally, a two-way time-of-flight is used where one component transmits a signal, another device receives the signal and responsively transmits another signal to the originating device. The processor 14 may be configured to identify the first to arrive signals, to distinguish between echoes of radio frequency or acoustic signals. The transmitted signal may include coding information indicating a time of transmission. The received signal may then be used to determine time-of-flight. Where synchronization between devices is unavailable, a two-way distance determination may avoid inaccuracies due to unsynchronized clocks. Alternatively, synchronization is provided allowing one-way or two-way determination of distance. The synchronization is provided over a common clock or heartbeat signal provided wirelessly or through a wired connection to the device 10. Alternatively, the distance is input by a user or measured manually.

To minimize the effects of interference, both acoustic and radio frequency distance determinations may be performed at same or different times. Other mechanisms to minimize the effects of noise may be provided, such as only accepting distances less than a certain value, such as 10 meters or other value associated with a likely relationship between two devices 10. The threshold may vary as a function of the type of device 10.

FIG. 2 shows a floor layout for a network of devices 10 operating with one or more controllers 22 within a building 24. The devices 10 are located throughout the building at spaced apart or distally located positions. One or more devices 10 may be located in each of or a number of rooms within the building 24. Different spacings may be provided. While one controller 22 is shown, a plurality of controllers 22 may be provided in other embodiments. Additional, different or fewer devices 10 and controllers 22 may be provided. Different distributions of the devices 10 may be provided. While shown as a single floor of a building 24, the network of devices 10 and controllers 22 may be distributed in three-dimensional space, including over multiple floors, a portion of the floor, a single room, a house or any other building 24 or portion thereof. In one embodiment, the network of devices 10 and controllers 22 is a network for wireless building automation or control, such as disclosed in U.S. patent application Ser. No. 10/915,034, which is incorporated herein in its entirety. Other wireless or wired networks may be provided in alternative embodiments.

The various devices 10 are of a same configuration or different configuration than each other. For example, some of the devices 10 correspond to sensor arrangements while other devices 10 correspond to actuator arrangements. The same or different communications devices, such as the transceiver 16 or the acoustic transceiver 18, 20, are provided for each of the devices 10. Alternatively, different communications mechanisms and/or protocols are provided for different groups of the devices 10. The devices 10 may operate in an integrated manner for implementing one or multiple types of building automation control. Alternatively, different networks are provided for different types of building automation, such as security, HVAC and fire systems.

The controller 22 is a device 10 without a sensor or actuator 12. Alternatively or in addition, the controller 22 includes a sensor or actuator 12, and is operable to provide control services for other devices 10. The controller 22 wirelessly communicates with one or more spaced apart building automation devices 10. For example, acoustic or radio frequency communications are provided.

A distance determination is made between a controller 22 and one or more devices 10, between devices 10, between one or more devices device 10 and a reference source, between one or more controllers 22 and a reference point, or any combination thereof. A reference source may be any device 10, controller 22, processor or other object located at a known coordinate location within a reference system. The distances may be determined without information or control from the controller 22. Alternatively, the controller 22 triggers, controls or alters the distance determination between two given devices 10. In other embodiments, the distance associated with the device 10 is performed relative to the controller 22, such as where the position of the controller 22 is known.

The distance determination may be performed using wired or wireless transmissions or manual measurements. Wireless radio frequency transmissions and receptions between building automation components within a network, between a component and a reference point, or between similar components for determining a distance may be performed. Spread spectrum or code phasing may be used for distance determinations. The distance may be determined as the result of one or more radio-frequency communications of a test signal, may be based on transmission and reception of acoustic signals, such as an ultrasound signal, or combinations thereof. The distance determination may be a one-way distance determination based on the time-of-flight from the transmission of the signal to the reception of the signal. Clocks or time stamps provide accurate relative timing. The distance determination may be made based on two-way communications using a predetermined time-delay. Other control schemes or mechanisms may also be provided. Examples of schemes, techniques, methods, processes and apparatuses for wirelessly determining distances in automated building control are described in co-pending patent applications, U.S. patent application Ser. No. 10/937,078, filed on Sep. 9, 2004 and entitled Distance Measurement for Wireless Building Automation Devices, the disclosure of which is incorporated in its entirety herein by reference.

The distance determination may provide distances between devices 10, between controllers 22, and/or between devices 10 and controllers 22. The distances may be include distances between devices 10 and/or controllers 22 at known or predetermined coordinate locations (X, Y, Z) and at unknown or yet to be determined coordinate locations. A known or predetermined coordinate location may be used as a reference point or source for determining coordinate locations for unknown coordinate locations. The distance determination also may include one or more projection angles, vector information, and/or polar coordinate locations for and between the devices 10 and/or controllers 22.

In one embodiment, the controller 22 provides a reference point and has a known coordinate location within a building structure. The coordinate system identifying the known location of the controller 22 may be any system for identifying the location of controller. The coordinate system may be a two-dimensional or three-dimensional reference system. The coordinate system may be associated with the structure of the building 24, equipment within the building 24, a blueprint for the building, relative to the earth or any other reference chart.

The distances between devices 10, between a device 10 and a controller 22, between devices 10 and a reference point, and/or between a controller 22 and a reference point are identified and stored as distance information in a storage device. The storage device may be a memory of the controller 22, the device 10, a combination of the controller 22 and devices 10 or other local or remote memory. Alternatively or additionally, the distance may be stored in a memory of central processor 26. The central processor 26 may be in communication with the controller 22. The central processor 26 may be coupled with the controller 22 through a wired or wireless communication. The central processor 26 also or alternatively may be in communication with devices 10 through a wired or wireless communication. The central processor 26 may also provide a reference point on which distance determinations are based.

Based on the distance information, local position or coordinate location for the devices 10 and controllers 22 are determined. The locations of the devices 10 may be determined or triangulated based on a known or predetermined location, such as the location of a controller 22 and/or the central processor 26. The locations of the devices 10 and the controller 22 also may be determined or triangulated based on the distances between the devices 10. The location and position information may be stored in the database 28. The database 28 may cross-reference identification information for devices 10 and controllers 22, such as address and type information, with corresponding distance, position and/or location information. Alternatively or additionally, the distance, location and/or position information may be stored in the memory storage of the devices 10, the controllers 22 or distributed among the devices 10 and the controllers 22.

Figure 3:
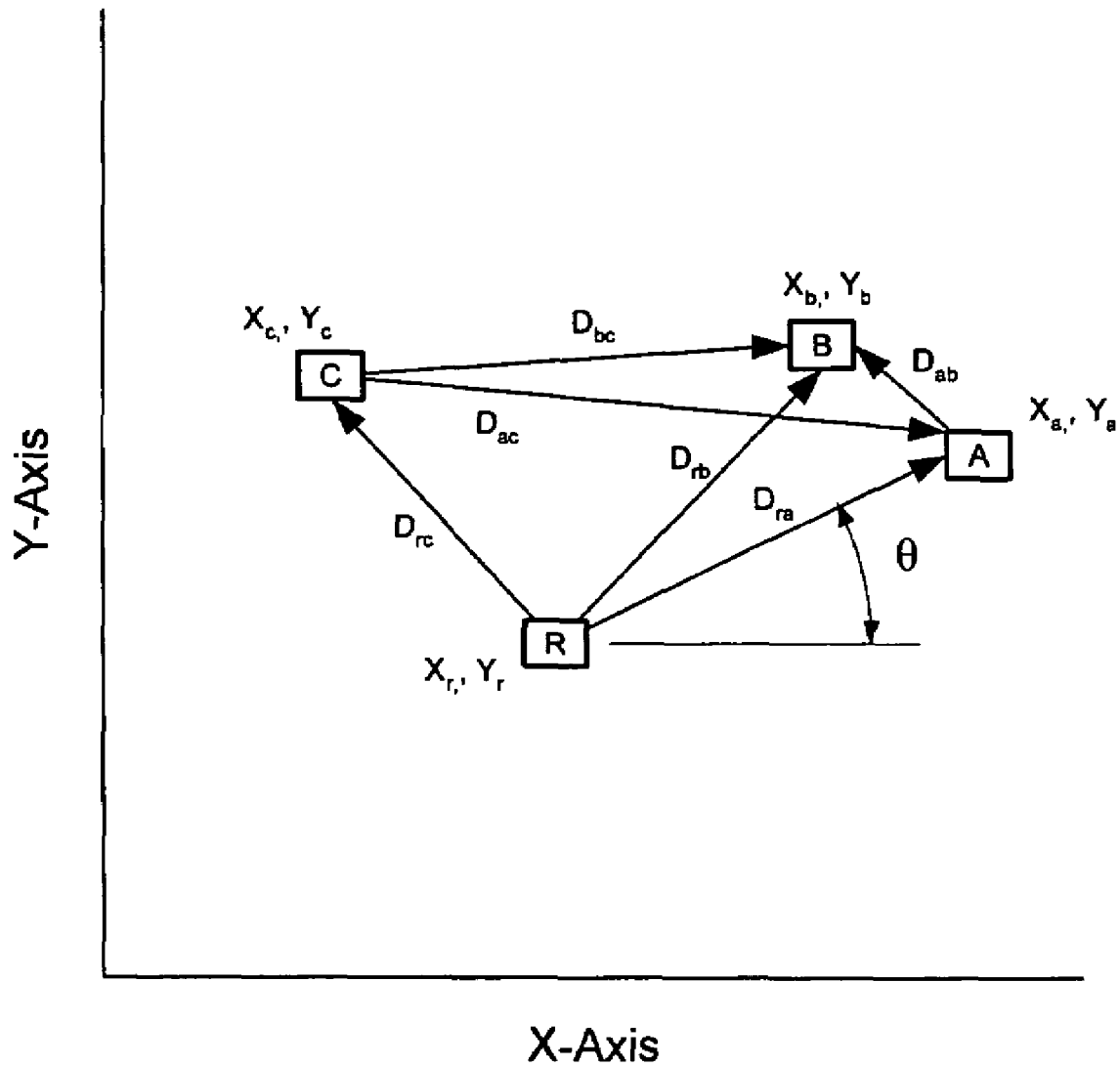
FIG. 3 is a diagram of one embodiment for determining coordinate locations for building automation devices.

FIG. 3 illustrates an example a coordinate location determination for a network of devices A, B, C in a two-dimensional coordinate system (X, Y). Although three devices A, B, C are shown distributed in a two-dimensional coordinate system (X, Y) to simplify the description, the principles apply to multiple devices located in three-dimensional coordinate systems (X, Y, Z). The network includes devices A, B, C and a reference source R. The devices A, B, C and reference source R may be any device 10 or controller 22 configured for wireless building automation. The devices A, B, C may be located spaced apart at unknown coordinate locations. The unknown coordinate locations may be identified using distance information. The reference source R may be located at a known location $(x_r, y_r)$. The location $(x_r, y_r)$ for the reference source R may be any known point within the coordinate system (X, Y). In an embodiment, the reference source is located an origin (0, 0) for the coordinate system.

The coordinate locations for devices A, B, C, may be determined according to distance determinations between devices A, B, C and the reference source R. For example, the distances between devices are determined using directional wireless communication with devices having one or more directional antennae, an array of transceivers or other devices configured for directional wireless communication. A projection angle θ to the device from the reference source R and/or between the devices A, B, C is determined. For example, a projection angle $\theta_a$ between reference source R and device A is used to determine a coordinate location for device A. The projection angle $\theta_a$ may be the angle between a straight line or vector connecting reference source R and device A, and an axis such as the X-axis. Additionally or alternatively, the distance determination may include a determination of a projection angle $\theta_a$, $\theta_b$, $\theta_c$, for devices A, B, C, respectively. The distance determinations and projection angles may be determined by a processor. The distance determinations and projection angles may also be stored a searchable database that cross-references the distance determinations and projection angles to associated identification information for the devices 10 and controllers 22.

A distance determination between the reference source R and device A may be referred to as $D_{ra}$. Likewise, distance between reference source R and B is $D_{rb}$; between reference source R and device C is $D_{rc}$. The distances between devices A, B, C may be referred to as $D_{ab}$, $D_{ac}$, $D_{bc}$. Based on the distance information from the reference source located at an origin and the projection angles, coordinate locations $(x_i, y_i)$ for devices A, B, C may be determined as:

$$x_a = D_{ra} \cos(\theta_a) \quad \text{Eq. 1}$$

$$y_a = D_{ra} \sin(\theta_a) \quad \text{Eq. 2}$$

$$x_b = D_{rb} \cos(\theta_b) \quad \text{Eq. 3}$$

$$y_b = D_{rb} \sin(\theta_b) \quad \text{Eq. 4}$$

$$x_c = D_{rc} \cos(\theta_c) \quad \text{Eq. 5}$$

$$y_c = D_{rc} \sin(\theta_c) \quad \text{Eq. 6}$$

If the reference source is located at a coordinate location other than the origin (0,0), the coordinate location of the reference source may be added to the determined coordinate locations for devices A, B, C using Equations 1-6 above to determine the coordinate locations for the devices A, B, C. Similarly, where a distance between a device at an unknown coordinate location and a reference source R is not known or otherwise unavailable, the coordinate location for the device at an unknown coordinate location may be determined with respect to the distance to a device at known coordinate location.

Where a projection angle θ is determined for less than all devices, the coordinate locations of devices may be determined according to distance information between devices $D_{ab}$, $D_{ac}$, $D_{bc}$, and distances $D_{ra}$, $D_{rb}$, $D_{rc}$. Equations 1 and 2 above may be used to determine the coordinate location for Device A ($x_a$, $y_a$). For example, the square of the distance between two points is equal to the sum of the squares of the differences between coordinate locations for the two points. (that is $D_{ij}^2=(x_i-x_j)^2+(y_i-y_j)^2$ for two-dimensional space, and $D_{ij}^2=(x_i-x_j)^2+(y_i-y_j)^2+(z_i-z_j)^2$ for three-dimensional determinations). Because the coordinate location determination involves identifying two variables, two independent distance determinations may be used to solve for the two coordinates ($x_i$, $y_i$).

An unknown coordinate location may be determined based on the known distance from two or more known locations. In an example shown in FIG. 3, the determined coordinate locations for device A ($x_a$, $y_a$) may be used with the coordinate locations for reference source R and the distances $D_{ab}$, $D_{ac}$, $D_{rb}$, and $D_{rc}$ to determine coordinate locations for ($x_b$, $y_b$) for device B and ($x_c$, $y_c$) for device, using triangulation principles, as follows:

$$D_{rb}^2=(x_b-x_r)^2+(y_b-y_r)^2 \qquad \text{Eq. 7}$$

$$D_{ab}^2=(x_b-x_a)^2+(y_b-y_a)^2 \qquad \text{Eq. 8}$$

$$D_{rc}^2=(x_c-x_r)^2+(y_c-y_r)^2 \qquad \text{Eq. 9}$$

$$D_{ac}^2=(x_c-x_a)^2+(y_c-y_a)^2 \qquad \text{Eq. 10}$$

Similarly, the coordinate location for device C ($x_c$, $y_c$) may be determined using triangulation determinations using the determined coordinate location ($x_b$, $y_b$) for device B and corresponding distance determination $D_{bc}$ and one or more of the coordinate locations for device A and reference source R, and the two corresponding known distances $D_{ac}$, $D_{rc}$.

The determined coordinate locations ($x_a$, $y_a$), ($x_b$, $y_b$), ($x_c$, $y_c$) may be used to determine whether an erroneous distance determination was made. For example, an erroneous distance determination ($D_{ij}'$) may have propagated an erroneous coordinate location ($x_j'$, $y_j'$) determination for a device. The erroneous distance determination ($D_{ij}'$) may have been due to an echo effect or reflective communication during the distance determination process. The erroneous coordinate location ($x_j'$, $y_j'$) may be identified by comparing distance information to the erroneously determined coordinate location from proximate coordinate locations. For example, an erroneous coordinate location ($x_j'$, $y_j'$) may have been determined based on an erroneous distance determination $D_{ij}'$. The coordinate location ($x_j'$, $y_j'$) may be identified as erroneous by comparing the determined coordinate locations for a device ($x_j$, $y_j$) from proximate devices. Where more than one coordinate locations ($x_j$, $y_j$) ($x_j'$, $y_j'$) are determined, it may be inferred that one of the determined coordinate locations is based on an erroneous distance determination to that location. An erroneous distance determination may be identified as a greater of the two distances determinations from a source to ($x_j$, $y_j$) ($x_j'$, $y_j'$), since the erroneous distance between two devices will indicate a greater distance than an actual distance between the devices.

In an example, an erroneous coordinate location ($x_c'$, $y_c'$) for device C may have been determined based on an erroneous distance determination $D_{ac}'$. The erroneous coordinate location ($x_c'$, $y_c'$) may be identified by comparing the determined coordinate locations for a device C to identify ($x_c'$, $y_c'$) as different a coordinate location that is different from coordinate locations ($x_c$, $y_c$) determined from other reference sources. The coordinate location for device C may be erroneous because of an inaccurate distance determination $D_{ac}'$. The coordinate location ($x_c'$, $y_c'$) is compared the coordinate location ($x_c$, $y_c$) as determined from multiple other reference sources. Because a proper coordinate location for C should be common from all reference sources, an erroneous coordinate location ($x_c'$, $y_c'$) is identified as being different from other determined coordinate locations for C ($x_c$, $y_c$). If ($x_c'$, $y_c'$) does not equal ($x_c$, $y_c$), then one of the distance determinations to determine the coordinate location for C may be inferred as erroneous or inaccurate. The erroneous distance $D_{ac}'$ may be identified by comparing the reference sources used to determine ($x_c'$, $y_c'$) and identifying the that is not used in proper coordinate location determinations C. An accurate distance $D_{ac}$ may be determined by calculating the distance using the proper coordinate location for C and the coordinate location for A.

Figure 4:
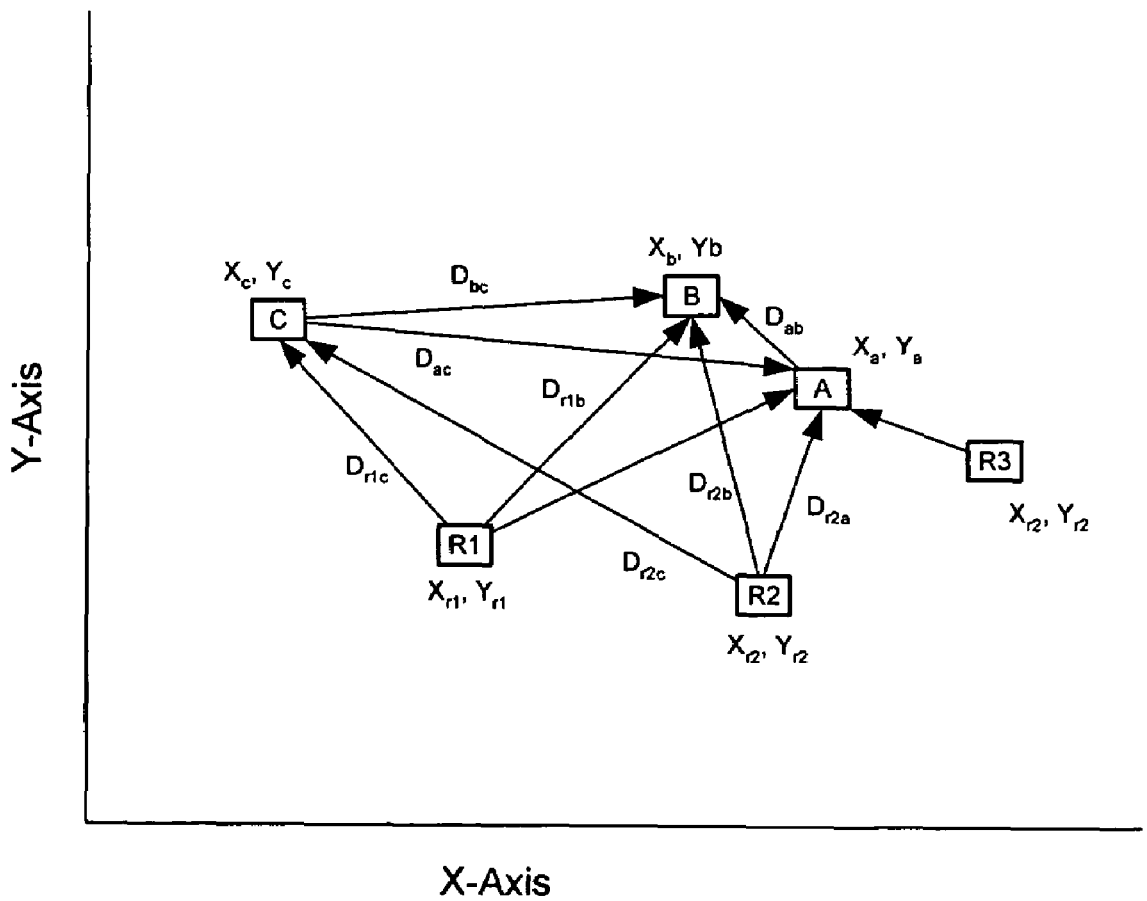
FIG. 4 is a diagram of another embodiment for determining coordinate locations for building automation devices.

FIG. 4 illustrates an embodiment for determining coordinate locations for devices A, B, C, in two-dimensional space using multiple reference sources R1, R2, and R3. The embodiment may be used, for example, where distance determinations are made using omni-directional communication. The embodiment also may be used where directional information or projection angle information is not provided using wireless communication. Although the principles are illustrated with respect to determining the coordinate location for three devices using three reference sources R1, R2, and R3 in a two-dimensional space to simplify the description, the described principles apply to determining multiple coordinate locations in three-dimensional space. The principles also apply to using two reference sources and to using more than three reference sources.

The devices A, B, C and reference sources R1, R2 and R3 are spaced apart. The reference sources R1, R2 and R3 are each positioned at corresponding known locations ($x_{r1}$, $y_{r1}$), ($x_{r2}$, $y_{r2}$), and ($x_{r3}$, $y_{r3}$). Preferrably, the reference sources R1, R2 and R3 are not all located along a common axis. The reference sources R1, R2 and R3 may be any device 10 or controller 22 configured for wireless building automation. The reference devices also may be a processor configured for wireless communication with building automation devices. The distances between devices A, B, C and between devices A, B, C and reference sources R1, R2, and R3 are determined using wired or wireless distance determination techniques.

Since the devices A, B, C and reference sources R1, R2 and R3 are spaced apart, distance information between all devices A, B, C and/or all devices A, B, C, and all reference sources R1, R2, and R3 may not be available. For example, device C may be out of communication range with reference source R3. Because device C is out of communication range with R3 distance information between R3 and device C may not be available. However, the determined distance information to reference sources R1, R2, and R3 may be used to propagate determined coordinate locations for device outside the range of communication of reference sources.

The coordinate locations for devices A, B, C may be determined using triangulation determinations with available distance information to known or predetermined coordinate locations. For example, a coordinate location ($x_a$, $y_a$)

for device A (or $x_a$, $y_a$, $z_a$ in three dimensional space) is determined using the distance information to reference sources R1, R2, and R3 at known or predetermined coordinate locations. The known or predetermined coordinate location of three or more reference sources R1, R2, and R3 may be used to determine an unknown coordinate location in both two-dimensional and three dimensional systems. Using the coordinate locations $(x_{r1}, y_{r1})$, $(x_{r2}, y_{r2})$, and $(x_{r3}, y_{r3})$ and corresponding distance information $D_{r1a}$, $D_{r2a}$, $D_{r3a}$, the coordinates $(x_a, y_a)$ ($x_a, y_a, z_a$ in three dimensional space), are determined using triangulation determinations. For example, the distance $D_{ij}$ to a device at $(x_i, y_i)$ from a known location at $(x_j, y_j)$ satisfies the principle of $D_{ij}^2=(x_i-x_j)^2+(y_i-y_j)^2$. In a three-dimensional determination, the three-dimensional coordinate location may be determined as $D_{ij}^2=(x_i-x_j)^2+(y_i-y_j)^2+(z_i-z_j)^2$. Accordingly, Applying the known distances $D_{r1a}$, $D_{r2a}$, $D_{r3a}$ and the known coordinate locations $(x_{r1}, y_{r1})$, $(x_{r1}, y_{r1})$, $(x_{r1}, y_{r1})$, the coordinate location $(x_a, y_a)$ may be determined as follows:

$$D_{r1a}^2=(x_{r1}-x_a)^2+(y_{r1}-y_a)^2 \qquad \text{Eq. 11}$$

$$D_{r2a}^2=(x_{r2}-x_a)^2+(y_{r2}-y_a)^2 \qquad \text{Eq. 12}$$

$$D_{r3a}^2=(x_{r3}-x_a)^2+(y_{r3}-y_a)^2 \qquad \text{Eq. 13}$$

The determined coordinate location $(x_a, y_a)$ may be used to propagate the determination for unknown coordinate locations for other devices B, C. For example, a processor may be configured to determine the coordinate location for unknown devices 10 and or controllers 22 based on previously determined or known coordinate locations.

Figure 5:
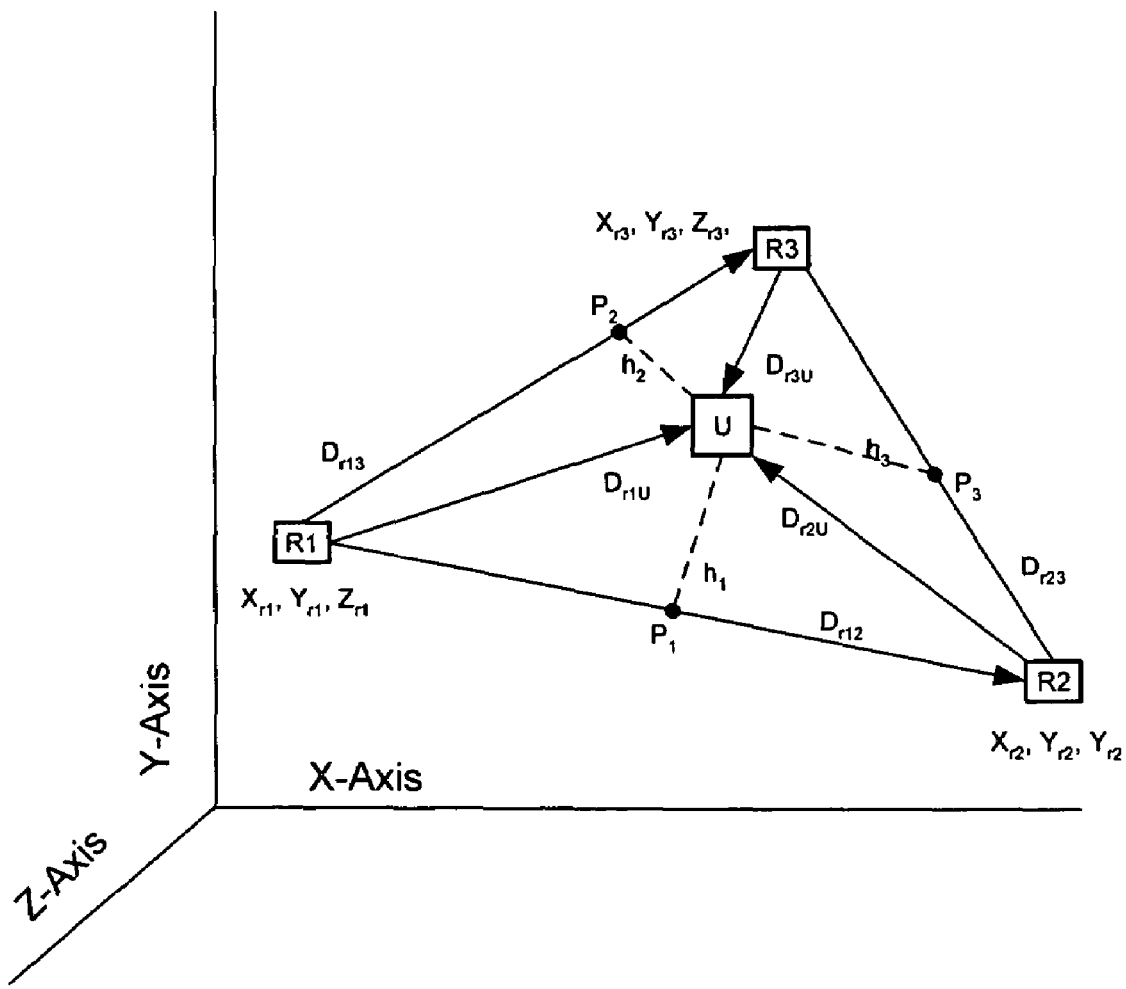
FIG. 5 illustrates another embodiment for determining an unknown coordinate location determining for building automation devices.
Figure 6:
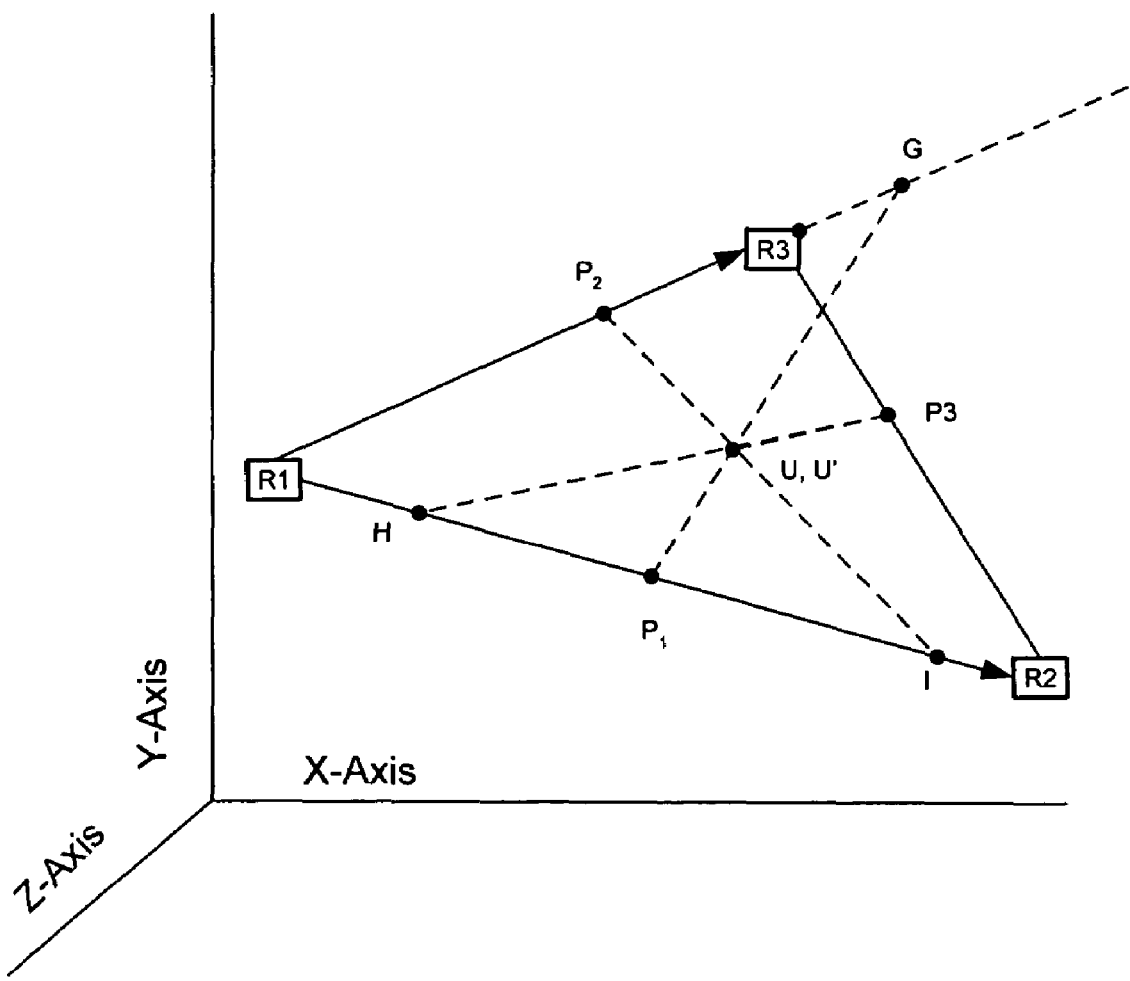
FIG. 6 illustrates a diagram for determining an unknown coordinate location for building automation devices.

FIG. 5 illustrates yet another embodiment for determining and propagating determinations of unknown coordinate locations U in a three-dimensional space. An unknown three-dimensional coordinate location U(x, y, z) may be determined using coordinate locations and distance information from three or more known or predetermined coordinate locations R1, R2, R3 and corresponding distances between the known or predetermined coordinate locations. Although FIG. 5 illustrates a single unknown coordinate location U, the principles apply to determining coordinate locations for multiple unknown locations based on distance information between the unknown coordinate location and known coordinate locations.

The reference sources R1, R2, R3 are located or positioned with respect to a coordinate system at locations $(X_{r1}, Y_{r1}, Z_{r1})$, $(X_{r2}, Y_{r2}, Z_{r2})$, and $(X_{r3}, Y_{r3}, Z_{r3})$, respectively. The distance to the unknown location U from each of the reference sources R1, R2, R3 may be determined and respectively identified as $D_{r1U}$, $D_{r2U}$, $D_{r3U}$. The reference sources R1, R2, R3 may be paired to form a triangle with the unknown location. For example, reference source R1 may be paired with reference source R2 to form a triangle with the unknown location. Similarly, reference source R1 is paired with the reference source R3, and reference source R2 is paired with R3. The base of each triangle is the distance between the reference sources R1, R2, R3 for each pair. The distance between reference sources R1, R2, R3 may be known, predetermined or determined based on the known relative coordinate locations of the reference sources R1, R2, R3. The length of the other two sides of each triangle equal the corresponding distances $D_{r1U}$, $D_{r2U}$, $D_{r3U}$ to the unknown location U. An area of each triangle A1, A2, and A3 may be determined using the length of the three sides of the triangle. For example, Herons Theorem may be applied to determine areas $A_1$, $A_2$, and $A_3$. A corresponding height $h_1$, $h_2$, $h_3$, for each triangle may be determined according to $A=\frac{1}{2}bh$. The height for each triangle $h_i$ is the straightline distance between the unknown location and the base of the triangle that is formed between the references source pairs. The straightline distance is perpendicular to the base of the corresponding triangle at points $P_1$, $P_2$, $P_3$.

The three triangles together form the sides of a tetrahedron. To simplify a determination of the unknown coordinate location U, the tetrahedron may be referred to or associated with a reference coordinate system (X', Y', Z'). The reference coordinate system (X', Y', Z') may have a known orientation and scaling with respect to the original coordinate system (X, Y, Z). The tetrahedron may be oriented with respect to the reference coordinate system (X', Y', Z') such that the three reference sources R1, R2, R3 are coplanar in an X'-Y' plane. The three reference sources R1, R2, R3 form the base of the tetrahedron where the longest of the distances $D_{r12}$, $D_{r13}$, $D_{r23}$ may be oriented as an X'-axis. A reference Y' axis is coplanar with and perpendicular to the X'-axis. A reference Z'-axis is perpendicular to the plane formed by the X'-axis and Y'-axis. The unknown point therefore is determined to be either above or below the base of the tetrahedron along the Z'-axis. In an example, the longest of the distances of the based of the tetrahedron is $D_{r12}$, where the reference source R1 may be considered the origin of the reference coordinate system (X', Y''', Z'). Other orientations and reference coordinate systems are possible. Additionally, the principles apply to determining the unknown coordinate location U using the original coordinate system (X, Y, Z). The unknown point therefore is determined to be either above or below the base of the tetrahedron.

For each triangle, the points $P_1$, $P_2$, $P_3$ and the heights $h_1$, $h_2$, $h_3$ are identified or determined. The heights $h_1$, $h_2$, $h_3$ may be considered a radius of a circle about the base of the triangle cited at respective points $P_1$, $P_2$, $P_3$. The circles that may be formed about each base intersect at a point U' on the plane of the base of the tetrahedron, or in the X'-Y' plane. The point U' may be consider the projection of unknown location U in the plane of the base of the tetrahedron, which is in the X'-Y' plane. A line passing through point U' and perpendicular to the base of the tetrahedron will pass through point U. The length or distance between R1 and P1 may be considered the X coordinate for the unknown location in the reference coordinate system (X', Y', Z'). The length or distance between P1 and U' is considered a Y coordinate for the unknown location U in the reference coordinate system (X', Y', Z') and the length or distance between U' and U is considered a Z coordinate for the unknown location U in the reference coordinate system (X', Y', Z').

Using trigonometric functions, identities and principles, such as the law of sines and cosines, and the angles of the triangles, the distance between P1 and U' and between U' and U may be determined. For example, the line between $P_1$ and U' may be extended to intersect the line between R1 and R2 at point G. Similarly, the line between $P_2$ and U' may be extended to an intersection point I with the line between R1 and R2 and the line between $P_3$ and U' may be extended to an intersection point H with the line between R1 and R2. From the determinations and angle, the following determinations may be made:

TABLE I

| Calc Length of: | Using: |
|---|---|
| R1G | R1P1/cos R1 |
| P1G | R1G/sin R1 |

TABLE I-continued

| Calc Length of: | Using: |
| --- | --- |
| R2H | P1G/cosR2 |
| EH | R2H/sinR2 |
| R1I | R1F/cosR1 |
| P3I | R1I/sinR1 |
| P1I | R1P1-R1I |
| IU' | P1I/sinR1 |
| P1U' (R1*) | IU'/cosR1 |
| P1H | R2H-R2P1 |
| HU' | P1H/sinR2 |
| P1U' (R2*) | HU'/cosR2 |
| P2G | R1G-R1P2 |
| GU' | P2G/sinR1 |
| P1U' (R3*) | P1G-GU' |
| P2U' (R1*) | GU'/cosR1 |
| P2U' | P2I-IU' |
| R3P2 | R1R3-R3P2 |
| R1U' | SQRT(R1P1$^2$ + P1U'$^2$) |
| R2U' | SQRT(R2P1$^2$ + P1U'$^2$) |
| R3U' | SQRT(R3P2$^2$ + P2U'$^2$) |
| U'U (R1*) | SQRT(R1U$^2$ + R1U'$^2$) |
| U'U (R2*) | SQRT(R2U$^2$ + R2U'$^2$) |
| U'U (R3*) | SQRT(R3U$^2$ + P2U'$^2$) |

The principles in Table I may be determined using a processor capable of performing rudimentary calculations and trigonometric functions. The determined lengths may be stored in a searchable database and cross-referenced to identification information associated with the devices 10 and controllers 22. The principles also provide multiple determinations for the coordinates for the unknown location with respect to the reference coordinate system (X', Y', Z').

The tetrahedron and the determined coordinate locations may be realigned to the original coordinate system (X, Y, Z). The determined distances, positions of the tetrahedron may be interpolated to the original coordinate system (X, Y, Z). The coordinate locations for reference sources R1, R2, R3 are known in the original coordinate system (X, Y, Z). The difference of the respective coordinates between reference sources R1 and R2 multiplied by the ratio of the lengths R1P1 to $R_{12}$ and added to the coordinate location for reference source R1 provide the coordinates for P1 in the original coordinate system (X, Y, Z). Similarly, the coordinate locations for G and U' may be determined with respect to the original coordinate system. A plane of the base of the tetrahedron may be identified, and an formulation for a line perpendicular to the plan determined. From the line, offsets of (X', Y', Z') to (X, Y, Z) are identified to determine a Z coordinate from Z'. Accordingly, X, Y, Z coordinates for U in the original coordinate system may be determined or interpolated.

The above calculations may result in more than one coordinate location for U where one point $U_a$ is determined above the plane formed by the base of the tetrahedron and another at a mirror location $U_b$ below the plane. One value $U_a$ or $U_b$ will be the correct coordinate location, and the other an improper coordinate location. The correct coordinate location for point U may be identified by comparing identified coordinate locations for U using the above properties from other reference sources forming tetrahedrons with U. For example, the coordinate location for U may be determined using distance information from reference sources $R_i$, $R_j$ and $R_k$ and corresponding distance information, where $R_i$, $R_j$ and $R_k$ may be any set of reference sources or points having a known or predetermined locations, including pairs of R1, R2, R3 with another reference source. A correct determination will have a common determination from other tetrahedrons with U as a point in the tetrahedron, whereas an incorrect determination will not be common. If there is no common determination for coordinate location of U, then the distance information used to determine the coordinate location U may be erroneous.

From the known distances and determined coordinate locations, other unknown locations may be determined. A new tetrahedron may be formed where the determined location U is used as a reference source for determining a coordinate location of another location. The coordinate determinations may be propagated for other unknown locations until the locations for all devices 10 and/or controllers 22 are determined. Erroneous distance determinations may be identified, by comparing coordinate location determinations to identify multiple distance determinations between points, where a larger distance may be identified as an improper distance determination. Where an identified location and/or distance determination is determined as erroneous, a correct coordinate location for the location may be determined using corrected distance information.

Figure 7:
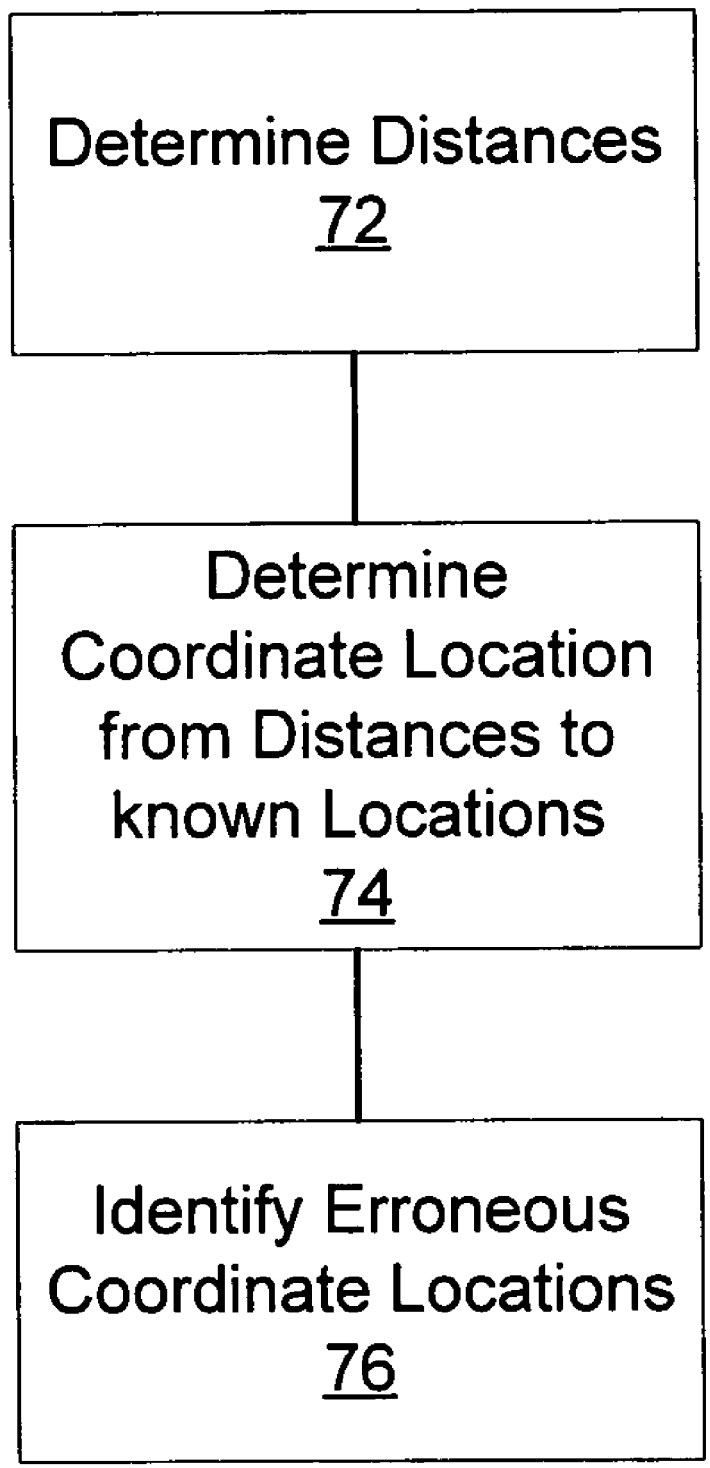
FIG. 7 is a flow chart diagram of one embodiment of a method for determining a distance for building automation components.

FIG. 7 shows an exemplary flowchart for a method for determining coordinate locations for building automation devices. The method is implemented using the devices 10 shown in FIG. 1, the network of devices 10 and controllers 22 shown in FIG. 2 or different devices or networks. Different, additional or fewer acts may be provided than shown in FIG. 7.

As represented in act 72, distance determinations for a network of devices, including a building automation device within a building, are performed. The distance determinations may include determining the distances based on wireless communication of distance information between building automation devices. The distance information may include distances between a plurality of building automation devices and distances to one or more reference points.

In act 74, the coordinate locations for devices are determined. In an embodiment, the coordinate locations for devices are determined using coordinate location and corresponding distance information to three or more devices each associated with a known or predetermined coordinate location. For example, a coordinate location for a first device is determined using distance information from the first device to three or more reference sources. The reference sources are each positioned at associated positions within a coordinate system. The coordinate location for the first device is determined using the coordinate locations for the three reference sources and the corresponding distance information from the first device to each of the reference sources. The coordinate location for a second device may be determined using the known or predetermined coordinate location of the reference sources and the corresponding distance information to each of the reference sources. The coordinate location to the second device also may be determined using the coordinate location of the first device and corresponding distance information and two or more reference sources. Similarly, a coordinate location for a third device may be determined using any combination of information associated with the reference sources and/or the first device and/or second devices. The location determination may be propagated for each device in a network until at coordinate location for each device is determined.

In act 76, erroneous coordinate locations are identified. From the identified erroneous coordinate locations, erroneous distance determinations may be identified. An erroneous distance determination may be identified by comparing distance determinations to the identified erroneous coordinate locations to identify a mismatch of distances to common points.

In one embodiment, the determined coordinate location information may be mapped or charted, such as on an electronic blueprint or system plan. The coordinate locations for the device may be cross-referenced to a building blueprint to identify a portion of the building, space or room in which the devices may be located. The coordinate locations and/or the corresponding rooms may be printed out in whole or in part as a listing of the devices and corresponding locations.

In another embodiment, the locations of multiple devices in a network are determined using distance information to known proximate locations to the devices. The coordinate location determination may be propagated along network devices as coordinate locations are determined for devices. The determined coordinate locations may be used to determine other coordinate locations. Similarly, a coordinate location may be verified using determined coordinate locations and distance information to proximate devices other than a proximate device used to determine the coordinate location for the device. A second determined coordinate location that is different that a first determined coordinate location may be used to identify an erroneous distance determination to a proximate device and to identify a proper coordinate location for the device.

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art. The various embodiments are not limited to the described environments, and have a wide variety of applications including integrated building control systems, environmental control, security detection, communications, industrial control, power distribution, and hazard reporting.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

I claim:

1. A method for locating building automation devices, the method comprising:
   (a) determining distances from a reference source to a plurality of building automation devices configured for directional wireless communication, the distances being determined using directional wireless communication between each of the plurality of building automation devices and the reference source, the reference source being a building automation device, controller, processor, or other object located at a known coordinate location within a reference system and each of the plurality of building automation devices being located at an unknown coordinate location;
   (b) determining projection angles from the reference source to each of the plurality of building automation devices, the projection angles being determined using directional wireless communication between each of the plurality of building automation devices and the reference source;
   (c) calculating a coordinate location for each of the plurality of building automation devices having an unknown coordinate location using the (1) the distances from the reference source to a corresponding one of the plurality of building automation devices determined via directional wireless communication and (2) the projection angle from the reference source to the corresponding one of the plurality of building automation devices determined via directional wireless communication;
   (d) storing the coordinate location calculated for each of the plurality of building automation devices using the distances and the projection angles determined via directional wireless communication in an electronic storage medium; and
   (e) subsequently determining an actual position of one of the plurality of building automation devices based upon the corresponding stored coordinate location.

2. The method of claim 1 further comprising mapping the coordinate locations determined via directional wireless communication with respect to the coordinate system for the building.

3. The method of claim 2 wherein the at least one reference source comprises a predetermined coordinate location and the distances are determined using time-of-flight information.

4. The method of claim 3 where the predetermined coordinate location comprises an origin of the coordinate system.

5. The method of claim 4 where the coordinate system comprises a three-dimensional coordinate system for the building.

6. The method of claim 2 wherein the coordinate location is further determined according to time-of-flight information associated with wireless communication between the reference source and at least one of the plurality of building automation devices.

7. The method of claim 1 further comprising triangulating one coordinate position using one or more distances that are determined using one-way or two-way time-of-flight information.

8. The method of claim 1 where step (a) comprises determining a distance to at least three reference sources for the plurality of building automation devices.

9. The method of claim 8 further comprising calculating a set of coordinate locations for at least one device using the distances determined to the at least three reference sources; and
   correcting an erroneous distance determination from the at least one device to one of the at least three reference sources using a correct coordinate location within the set of determined coordinate locations for the at least one device.

10. A method for identifying building automation devices, the method comprising:
    (a) determining a coordinate location for at least one building automation device located at an unknown location, the coordinate location being determined using data acquired via wireless communication between a reference source located at a known location and the at least one building automation device; and
    (b) propagating the coordinate location for the at least one building automation device determined using data acquired via wireless communication to a device outside the range of communication of the reference source, wherein an actual position of the at least one building automation devices is determined by the device or controller outside the range of communication of the reference source based upon the coordinate location determination propagated.

11. The method of claim 10 further comprising identifying an erroneous coordinate location for the at least one building automation device by comparing a plurality of coordinate location determinations for the at least one building automation device calculated using data acquired via wireless communication between the at least one building automation device and multiple reference sources.

12. The method of claim 11 further comprising correcting the erroneous coordinate location by using one or more other coordinate locations calculated using data acquired via wireless communication and identified as being correct.

13. A building automation system, the method comprising:
 a reference source located at a known coordinate location;
 a plurality of building automation devices located at unknown coordinate locations in wireless communication with the reference source and configured for directional wireless communication with the reference source; and
 a processor configured to determine a coordinate location for at least one building automation device solely as a function of (1) distance information determined using one-way or two-way time-of-flight information associated with directional wireless communication between the reference source and the at least one building automation device and (2) a projection angle also determined via directional wireless communication between the reference source and the at least one building automation device such that a physical location of the at least one building automation device may be determined based upon the coordinate location.

14. The system of claim 13 where the processor is configured to propagate the coordinate location determined via directional wireless communication to another device outside the range of communication of the reference source.

15. A building automation system, comprising:
 a plurality of spaced apart building automation devices configured to communicate over a wireless network using a wireless network communication protocol; and
 a controller in wireless communication with the plurality of spaced apart building automation devices, the controller configured to determine a coordinate location for at least one of the plurality of spaced apart building automation devices according to distance information for the at least one of the plurality of spaced apart building automation devices, the coordinate location being determined using triangulation between (1) a reference source located at a known coordinate location, (2) the at least one of the plurality of spaced apart building automation devices located at an unknown location, and (3) a second one of the plurality of spaced apart building automation devices whose location is determined using data acquired via wireless communication, wherein the coordinate location is used to determine a physical location of the at least one of the plurality of spaced apart building automation devices.

16. The building automation system of claim 15, where the controller is further configured to determine a corresponding coordinate location for each of the plurality of spaced apart building automation devices according to distance information for the plurality of spaced apart building automation devices acquired via wireless communication.

* * * * *